(12) United States Patent
Su

(10) Patent No.: US 10,849,451 B2
(45) Date of Patent: Dec. 1, 2020

(54) PORTABLE HOUSEHOLD BEVERAGE MACHINE

(71) Applicants: FOSHAN IMONS INTELLIGENCE TECHNOLOGY COMPANY LIMITED, Guangdong (CN); GOLDEN COFFEE ELECTRICAL COMPANY LIMITED, Guangdong (CN); NUEVO PTY LTD, Glen Iris VIC (AU)

(72) Inventor: HuiZhen Su, Guangdong (CN)

(73) Assignees: FOSHAN IMONS INTELLIGENCE TECHNOLOGY COMPANY LIMITED, Guangdong (CN); GOLDEN COFFEE ELECTRICAL COMPANY LIMITED, Guangdong (CN); NUEVO PTY LTD, Glen Iris Vic (AU)

(*) Notice: Subject to any disclaimer, the term of this patent is extended or adjusted under 35 U.S.C. 154(b) by 516 days.

(21) Appl. No.: 15/702,137

(22) Filed: Sep. 12, 2017

(65) Prior Publication Data

US 2018/0078077 A1 Mar. 22, 2018

(30) Foreign Application Priority Data

Sep. 22, 2016 (CN) .......................... 2016 1 0840691

(51) Int. Cl.
*A47J 31/10* (2006.01)
*A47J 31/24* (2006.01)
(Continued)

(52) U.S. Cl.
CPC ........... *A47J 31/005* (2013.01); *A47J 31/407* (2013.01); *A47J 31/3676* (2013.01)

(58) Field of Classification Search
CPC ........ A47J 31/005; A47J 31/407; A47J 31/10; A47J 31/24; A47J 31/32–36
See application file for complete search history.

(56) References Cited

U.S. PATENT DOCUMENTS

| 2006/0107839 A1 | 5/2006 | Nenov et al. |
| 2010/0218686 A1* | 9/2010 | O'Brien ................. A47J 31/34 |
| | | 99/289 R |

(Continued)

FOREIGN PATENT DOCUMENTS

| CA | 2945657 A1 | 11/2015 |
| CN | 101610703 A | 12/2009 |

(Continued)

OTHER PUBLICATIONS

English translation of CN 205458091 (Year: 2016).*

(Continued)

*Primary Examiner* — Michael A LaFlame, Jr.
(74) *Attorney, Agent, or Firm* — Muncy, Geissler, Olds & Lowe, P.C.

(57) ABSTRACT

The present invention relates to a portable household beverage machine comprising a body structure and a cup which is detachably connected to the body structure. A tank, a pump, a capsule bin for containing a substance to be brewed and a capsule bin pedestal for closing the capsule bin which are communicated in sequence are provided in the body structure. The capsule bin pedestal is detachably connected to the body structure or the capsule bin and is communicated with the cup. A space formed when the cup is connected to the body structure can contain all beverages that are output. In the portable household beverage machine according to the present invention, by arranging the tank, the pump, the capsule bin and the capsule bin pedestal in the body structure, and by detachably connecting the body structure with the cup, beverage machine is small in size and convenient (Continued)

for a user to carry. By arranging the pump, water in the tank automatically becomes high pressure water after passing through the pump, and then the high pressure water is mixed with the substance to be brewed in the capsule bin after flowing into the capsule bin, such that a beverage is made. The beverage flows into the cup connected to the body structure eventually, and then a user may drink the fragrant beverage after taking the cup.

25 Claims, 4 Drawing Sheets

(51) Int. Cl.
*A47J 31/36* (2006.01)
*A47J 31/00* (2006.01)
*A47J 31/40* (2006.01)

(56) References Cited

U.S. PATENT DOCUMENTS

| | | | |
|---|---|---|---|
| 2011/0265658 A1* | 11/2011 | Talon | A47J 31/407 99/289 R |
| 2012/0164295 A1* | 6/2012 | Hansen | A47J 31/461 426/474 |
| 2013/0243919 A1* | 9/2013 | Shrader | A47J 31/005 426/433 |
| 2015/0289705 A1* | 10/2015 | Van Boxtel | A47J 31/3614 99/289 R |
| 2019/0059640 A1* | 2/2019 | Wong | A47J 31/10 |
| 2020/0121115 A1* | 4/2020 | Oh | A47J 31/407 |

FOREIGN PATENT DOCUMENTS

| | | |
|---|---|---|
| CN | 202112910 U | 1/2012 |
| CN | 202143585 U | 2/2012 |
| CN | 202168742 U | 3/2012 |
| CN | 202477384 U | 10/2012 |
| CN | 103040358 A | 4/2013 |
| CN | 103654412 A | 3/2014 |
| CN | 203 506 413 U | 4/2014 |
| CN | 105 852 646 A | 8/2016 |
| CN | 205458091 U | 8/2016 |
| WO | WO 2015/173127 A2 | 11/2015 |
| WO | WO 2015173125 A1 | 11/2015 |
| WO | WO 2017/136311 A1 | 8/2017 |
| WO | WO 2018/107627 A1 | 6/2018 |

OTHER PUBLICATIONS

Examination Report issued in corresponding Australian patent application No. 2017232038 dated May 1, 2018.
Examination Report issued in corresponding Canadian patent application No. 2,979,668 dated Aug. 2, 2018.
First Search Report issued in corresponding CN patent application No. 201610840691.5 dated Sep. 22, 2016.
Search Report issued in corresponding International patent application No. PCT/CN2016/109866 dated Jun. 13, 2017.
Japanese Examination Report issued in corresponding Japanese Patent Application 2017-175353 dated Jul. 26, 2018.
Supplemental Search Report issued in CN Application No. 201610840691.5 dated Sep. 22, 2016.
Search Report issued in corresponding Taiwan patent application No. 106132070 Completion Date Jul. 13, 2018.
Search Report issued in European patent application No. EP 17 19 0686 dated Jan. 30, 2018.
Examination Report issued in European patent application No. EP 17 19 0686 dated May 25, 2020.

* cited by examiner

PORTABLE HOUSEHOLD BEVERAGE MACHINE

TECHNICAL FIELD

The present invention relates to the technical field of household appliance and, more specifically, to a portable household beverage machine.

BACKGROUND

With the improvement of living standards, people pay more and more attention to their living quality, and it has become necessary for a beverage lover to have a drink in the morning or leisure time. In most of the traditional ways of making beverage, boiled hot water is poured into a cup to brew beverage powder in the cup. The taste of the beverage brewed in such way is just so-so, which could not satisfy those who are strict in the taste of beverage, and therefore household beverage machine gradually comes into our sight. The existing household beverage machine, however, generally has a large size, which can only be placed at home for use and is not convenient for people to carry with, and thus people couldn't drink beverage that is just brewed, anytime and anywhere, when they go out to travel. Moreover, although some household beverage machines are small in size and convenient for a user to carry, when the user wants to drink beverage, he/she needs to manually pressurize to produce high pressure water so as to brew fragrant beverage, which also limits the use of the beverage machine.

SUMMARY OF THE INVENTION

The purpose of the present invention is to overcome the deficiencies of the prior art, and provides a portable household beverage machine, which not only is simple in structure, small in size, convenient for a user to carry, and satisfy the user's demand of drinking beverage anytime and anywhere, but can produce high pressure water automatically when brewing beverage, and brew the beverage that is fragrant as well.

In order to solve the above-mentioned technical problems, the technical solutions adopted in the present invention are as follows:

Provides a portable household beverage machine for adding a substance to be brewed into water to make a beverage, which comprises a body structure and a cup detachably connected to the body structure. A containing cavity for containing water, a pressurizing device, a containing cavity for containing a substance to be brewed and a containing cavity pedestal for closing the containing cavity where the substance to be brewed which are communicated in sequence are provided in the body structure. The containing cavity pedestal is detachably connected to the body structure or capsule bin, and is communicated with the cup. A space formed when the cup is connected to the body structure can contain all beverages that are output.

In the above-described solution, by means of arranging the containing cavity for containing water, the pressurizing device, the containing cavity for containing the substance to be brewed and the containing cavity pedestal for closing the containing cavity where the substance to be brewed in the body structure, and detachably connecting the body structure to the cup, the beverage machine is small in size and convenient for a user to carry. By arranging the pressurizing device, water in the containing cavity containing water automatically becomes high pressure water after passing through the pressurizing device, and then the high pressure water is mixed with the substance to be brewed in the containing cavity after flowing into the containing cavity where the substance to be brewed is located, such that a beverage is made. The beverage flows into the cup connected to the body structure eventually, and then a user may drink the fragrant beverage after taking the cup.

Preferably, the containing cavity for containing water is a tank, the containing cavity for containing the substance to be brewed is a capsule bin, and the containing cavity pedestal is a capsule bin pedestal. The pressurizing device is a pump.

Preferably, a pedestal of the cup is a level structure. When putting the portable household beverage machine on other objects such as a table top, the pedestal can support the beverage machine better, improving the stability of the beverage machine on the table top.

Preferably, wherein a prepared beverage is obtained after boiling, infiltrating or brewing the substance to be brewed with water in the capsule bin. This can ensure that the substance to be brewed is mixed well with water, so that the prepared beverage is more fragrant.

Preferably, the body structure comprises a first cavity and a second cavity which are connected in sequence. The tank is provided in the first cavity. The pump, the capsule bin and the capsule bin pedestal are provided in the second cavity. The cup is detachably connected to the second cavity.

Preferably, wherein a heating device for heating the tank is provided in the first cavity. Such arrangement is convenient for heating the tank in real time. Move preferably, the heating device is a PTC heating sheet arranged at a bottom of the tank. Such arrangement can ensure that water in the tank is rapidly heated, thereby reducing the waiting time for the user to drink a beverage.

Preferably, a battery for supplying electricity to the pump and the heating device is provided in the second cavity. Arrangement of the battery allows the user can prepare a beverage without any power supply outdoors, providing convenience to the user.

Preferably, the capsule bin pedestal is a piercing structure. The piercing structure is used for piercing a bottom of a beverage capsule placed in the capsule bin and communicating the beverage capsule with the cup. Such arrangement allows the user to prepare a beverage with the beverage capsule containing the substance to be brewed, preventing contamination of the capsule bin. When using, just need to open a hole in advance at a top of the beverage capsule.

Preferably, the piercing structure comprises a piercing seat, protrusions and through holes. The protrusion is arranged on an upper surface of the piercing seat and used for piercing the bottom of the beverage capsule located in the capsule bin. The through hole penetrates the piercing seat and is used for communicating the beverage capsule and the cup. When the protrusion contacts with the bottom of the beverage capsule located above the piercing structure, pressure is applied to the bottom of the beverage capsule. When the pressure in the beverage capsule reaches a certain value, the protrusion pierces the bottom of the beverage capsule, and the brewed beverage liquid in the beverage capsule flow out from the through hole into the cup. Such arrangement makes the beverage liquid in the beverage capsule able to flow out successfully, reducing the waiting time of the user.

Preferably, the through hole is arranged on the protrusion, and the protrusion has a hollow structure; or the protrusions and the through holes are arranged alternately on the piercing seat. Both of these solutions can realize piercing and flow diversion functions of the piercing structure. More preferably, the protrusions and the through holes are arranged in a grid. Such arrangement makes the whole piercing structure under a balance force, which can prevent problems, such as poor piercing effect and poor flow diversion effect bought by imbalance force, from occurring.

Preferably, the protrusion has a trapezoidal structure. Such arrangement makes the protrusion apply great pressure to the bottom of the beverage capsule under same pressure, facilitating piercing the bottom of the beverage capsule.

Preferably, the piercing structure further comprises a piercing seat body, the piercing seat being embedded in the piercing seat body, a bottom of the piercing seat body being provided with a beverage liquid outlet. More preferably, the piercing seat body is in a threaded connection or a snap-fit connection with a lock catch with the bottom of the capsule bin. Such arrangement makes the protrusion on the piercing structure closely contact with the bottom of the beverage capsule, which is convenient for the protrusion to pierce the bottom of the beverage capsule.

Preferably, a piercing tool for piercing a top of a beverage capsule is provided in the capsule bin. When using the beverage capsule to prepare a beverage, such arrangement can eliminate the need for open a hole in advance at the top of the beverage capsule, providing convenience to the user.

Preferably, the piercing tool comprises a piercing tool pedestal and blades arranged on the piercing tool pedestal. The piercing tool pedestal has a circular ring structure, the piercing tool pedestal being embedded in a top of the capsule bin. The top of the capsule bin is provided with an aperture being communicated with the outlet of the pump, an inner ring of the circular ring structure being directly opposite to the aperture of the top of the capsule bin. Such arrangement can simplify a structure of the capsule bin.

Preferably, the blades are arranged around the piercing tool pedestal. This can reduce size of the piercing tool pedestal while ensuring strength of the piercing tool pedestal, thereby reducing size of the capsule bin.

Preferably, a cutting edge of the blade has an inclined structure. Such arrangement makes a contact area of the cutting edge and the top of the beverage capsule increase gradually, the pressure applied to the top of the beverage capsule is relatively high when a tip of the cutting edge just contacts the top of the beverage capsule, which is convenient for the blade to pierce the top of the beverage capsule.

Preferably, bottom edges of the capsule bin extend outwardly. Such arrangement makes it function as support for the piercing structure when the piercing structure located below the capsule bin contacts with the beverage capsule, which is convenient for the piercing structure to pierce the bottom of the beverage capsule.

Preferably, a supporting structure is provided in the second cavity, the supporting structure comprising a first receiving cavity and a second receiving cavity which are vertical, the pump and the battery being fixedly mounted in the first receiving cavity and the second receiving cavity respectively. A bottom of the first receiving cavity is provided with an opening, the outlet of the pump being communicated with the capsule bin by the opening. After the pump and the battery are mounted into the supporting structure, their entirety has an approximately cylindrical structure. Such arrangement makes installation spaces of the pump, the battery and the capsule bin be arranged reasonably, thereby making the household beverage machine have a small overall volume and be convenient for the user to carry.

Preferably, the pump has an L-shaped structure, the inlet and the outlet of the pump being arranged in parallel in a horizontal direction of the L-shaped structure. Such arrangement can reduce a transverse space occupied by the pump, further reduces size of the supporting structure, and thereby reduces the size of the household beverage machine.

Preferably, the battery is detachably arranged in the second receiving cavity. When the user carries the household beverage machine while going out, the user may prepare a few more batteries to meet the requirement of making beverage at any time. More preferably, a waterproof element is provided between the battery and the second receiving cavity. Arrangement of the waterproof element can protect the battery better, and can prevent water from entering the battery.

Preferably, the opening has an oval structure, the opening having two ports, with one port being communicated with the outlet of the pump, the other port being located at a center of a bottom of the supporting structure. Such arrangement is convenient for guiding water from a side wall of the supporting structure to a center of the supporting structure, in order to prevent the beverage machine from being toppled which is caused by an impact force at the side wall of the supporting structure when brewing beverage later.

Preferably, two opposed fixing plates for fixing the pump are provided in the first receiving cavity. Arranging the pump between two fixing plates prevents a motor of the pump from driving the pump shaking during working, thereby leading to loosening of the structure connected to the inlet and the outlet of the pump, resulting in leakage at the inlet and the outlet of the pump.

Preferably, the supporting structure further comprises a fixing element for fixing the pump, the fixing element being connected to the first receiving cavity. After the fixing element is sleeved outside the pump, connecting both side of the fixing element with the first receiving cavity by a screw can further fix the pump, preventing the pump from shaking.

Preferably, a top of the tank is provided with a detachable cover. An exhaust port and a cover body is provided on the cover. The cover body has a hollowed-out structure and is arranged covering on the exhaust port. Arrangement of the exhaust port is convenient for exhausting steam in the household beverage machine, and arrangement of the cover body can prevent hot water from being ejected directly to hurt the user when the beverage machine is tilted. More preferably, a silicone pad is provided at a location where the cover fits over the tank. Such arrangement can prevent the tank from leaking.

Preferably, the portable household beverage machine further comprises a check valve, the outlet of the pump being communicated with the capsule bin by the check valve. Arrangement of the check valve can prevent reverse flow of the brewed beverage liquid.

Preferably, a silica gel is provided on an outer wall of the cup. The silica gel can increase friction between the cup and the desktop or the user's hand, playing an anti-skidding role.

Preferably, an AC adapter socket connected to the battery is provided on the body structure. Connecting both ends of a USB with the AC adapter socket and the car's power supply, the household beverage machine can be driven to prepare a beverage or charge the battery.

Preferably, the tank has a maximum capacity of 50 ml.

Preferably, the pump has a work pressure of at least 7 bars. More preferably, water in the pump has a pressure of 15 bars when entering into the beverage capsule. The high pressure water can ensure that the prepared beverage is fragrant as well.

Compared with the prior art, the beneficial effects of the present invention are as follows:

In a portable household beverage machine according to the present invention, by means of arranging the containing cavity for containing water, the pressurizing device, the containing cavity for containing the substance to be brewed and the containing cavity pedestal for closing the containing cavity where the substance to be brewed in the body structure, and detachably connecting the body structure to the cup, the beverage machine is small in size and convenient for a user to carry. By arranging the pressurizing device, water in the containing cavity containing water automatically becomes high pressure water after passing through the pressurizing device, and then the high pressure water is mixed with the substance to be brewed in the containing cavity after flowing into the containing cavity where the substance to be brewed is located, such that a beverage is made. The beverage flows into the cup connected to the body structure eventually, and then a user may drink the fragrant beverage after taking the cup. By arranging the pump an L-shaped structure, and arranging an inlet and an outlet of the pump in parallel in a horizontal direction of the L-shaped structure, it can reduce a transverse space occupied by the pump, further reduces size of a supporting structure, and thereby reduces size of the household beverage machine. By detachably arranging the battery in the second cavity, when a user carries the household beverage machine while going out, the user may prepare a few more batteries to meet the requirement of making beverage at any time. By arranging the detachable cover at the top of the tank, arranging an exhaust port and a cover body on the cover, and arranging the cover body a hollowed-out structure and covering on the exhaust port, not only steam in the household beverage machine is convenient to be discharged, but also hot water can be prevented from being ejected directly to hurt the user when the household beverage machine is tilted.

DETAILED DESCRIPTION OF THE PREFERRED EMBODIMENT

Figure 1:
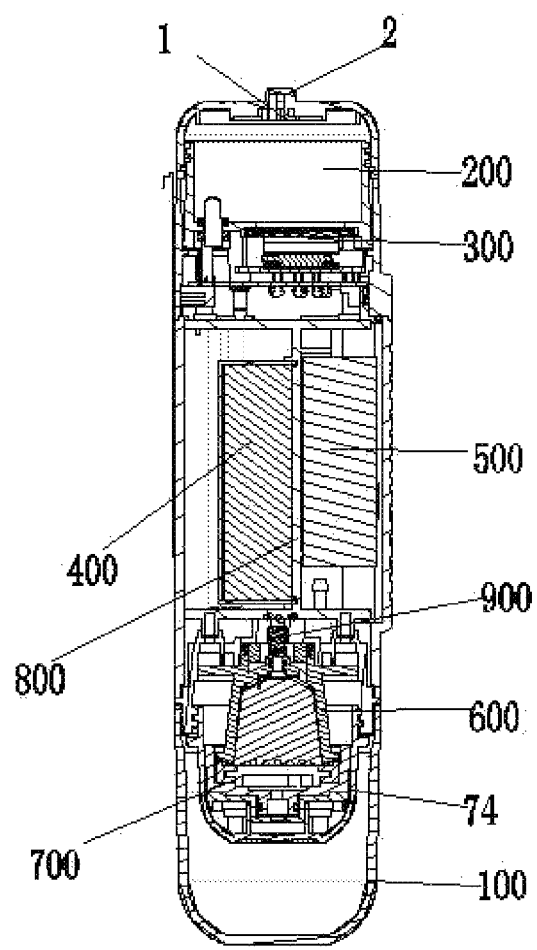
FIG. 1 is a section view of the portable household beverage machine according to an embodiment.

The present invention will be further described below in combination with specific embodiments. In particular, accompanied drawings which are only for exemplary illustration, are only intended to be schematics rather than physical maps, and thus they could not be interpreted as limitation to the present invention. In order to illustrate Embodiments of the present invention better, some parts will be omitted, enlarged or shrinked in the accompanied drawings, which does not represent the actual sizes of the products. For those skilled in the art, it is to be understood that some of well-known structures and illustrations thereof may be omitted.

In the accompanied drawings of embodiments of the present invention, identical or similar reference numbers correspond to the identical or similar parts. In the description of the present invention, it is to be understood that, if there is orientation or positional relationship indicated by the terms such as "upper", "lower", "lower", "right" and "right", it is based on the orientation or positional relationship shown in the accompanied drawings, which is only for convenience in describing the present invention and simplifying the description, rather than indicating or implying that the referring device or element must has a particular orientation, be configured and operated in a particular orientation. Thus the wordings describing positional relationship in the accompanied drawings are only used for exemplary illustration, which could not be interpreted as limitation to the present invention. For those having ordinary skill in the art, specific meanings of the above-mentioned terms may be understood according to specific circumstances.

Embodiment 1

A portable household beverage machine according to the present embodiment has schematic views shown as FIG. 1 to FIG. 6, for adding a substance to be brewed into water to make a beverage. It comprises a body structure and a cup 100 which is detachably connected to the body structure. A containing cavity for containing water, a pressurizing device, a containing cavity for containing a substance to be brewed and a containing cavity pedestal for closing the containing cavity where the substance to be brewed is located which are communicated in sequence are provided in the body structure. The containing cavity pedestal is detachably connected to the body structure or the containing cavity where the substance to be brewed is located, and is communicated with the cup 100. A space formed when the cup 100 is connected to the body structure can contain all beverages that are output.

In the present embodiment, the containing cavity for containing water is a tank 200, the containing cavity for containing the substance to be brewed is a capsule bin 600, and the containing cavity pedestal is a capsule bin pedestal. The pressurizing device is a pump 500.

In particular, a pedestal of the cup 100 is a level structure. When putting the portable household beverage machine on other objects such as a table top, the pedestal can support the beverage machine better, improving the stability of the beverage machine on the table top.

In addition, a prepared beverage is obtained after boiling, infiltrating or brewing the substance to be brewed with water in the capsule bin 600. This can ensure that the substance to be brewed is mixed well with water, so that the prepared beverage is more fragrant.

In particular, the body structure comprises a first cavity and a second cavity which are connected in sequence. The tank 200 is provided in the first cavity. The pump 500, the capsule bin 600 and the capsule bin pedestal are provided in the second cavity. The cup 100 is detachably connected to the second cavity.

In addition, a heating device 300 for heating the tank 200 is provided in the first cavity. Such arrangement is convenient for heating the tank in real time. In the present embodiment, the heating device 300 is a PTC heating sheet arranged at a bottom of the tank 200. Such arrangement can ensure that water in the tank 200 is rapidly heated, thereby reducing the waiting time for the user to drink a beverage.

In particular, a battery 400 for supplying electricity to the pump 500 and the heating device 300 is provided in the second cavity. Arrangement of the battery 400 allows the user can prepare a beverage without any power supply outdoors, providing convenience to the user.

In addition, the capsule bin pedestal is a piercing structure 700. The piercing structure 700 is used for piercing a bottom of a beverage capsule placed in the capsule bin 600 and communicating the beverage capsule with the cup 100. Such arrangement allows the user to prepare a beverage with the beverage capsule containing the substance to be brewed, preventing contamination of the capsule bin. When using, just need to open a hole in advance at a top of the beverage capsule.

In particular, the piercing structure 700 comprises a piercing seat 71, protrusions 72 and through holes 73. The protrusion 72 is arranged on an upper surface of the piercing seat 71 and used for piercing the bottom of the beverage capsule located in the capsule bin 600. The through hole 73 penetrates the piercing seat 71 and is used for communicating the beverage capsule and the cup 100. When the protrusion 72 contacts with the bottom of the beverage capsule located above the piercing structure 700, pressure is applied to the bottom of the beverage capsule. When the pressure in the beverage capsule reaches a certain value, the protrusions 72 pierces the bottom of the beverage capsule, and brewed beverage liquid in the beverage capsule flows out from the through holes 73 into the cup 100. Such arrangement makes the beverage liquid in the beverage capsule able to flow out successfully, reducing the waiting time of a user.

Figure 2:
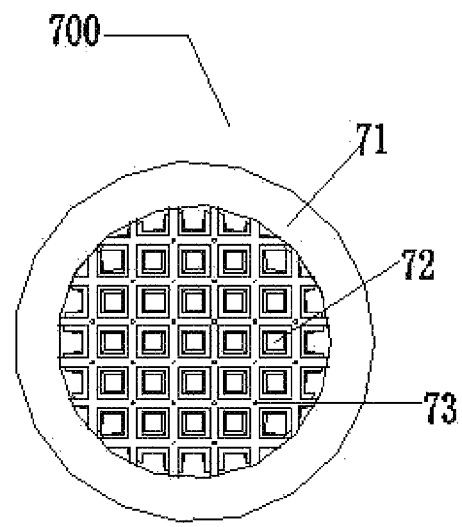
FIG. 2 is a front view of the piercing structure in FIG. 1.
Figure 3:
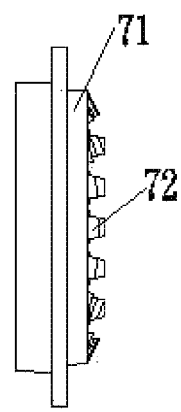
FIG. 3 is a side view of the piercing structure in FIG. 1.
Figure 4:
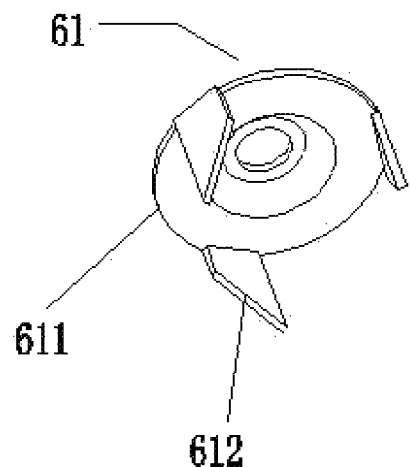
FIG. 4 is a schematic view of the piercing tool in FIG. 1.
Figure 5:
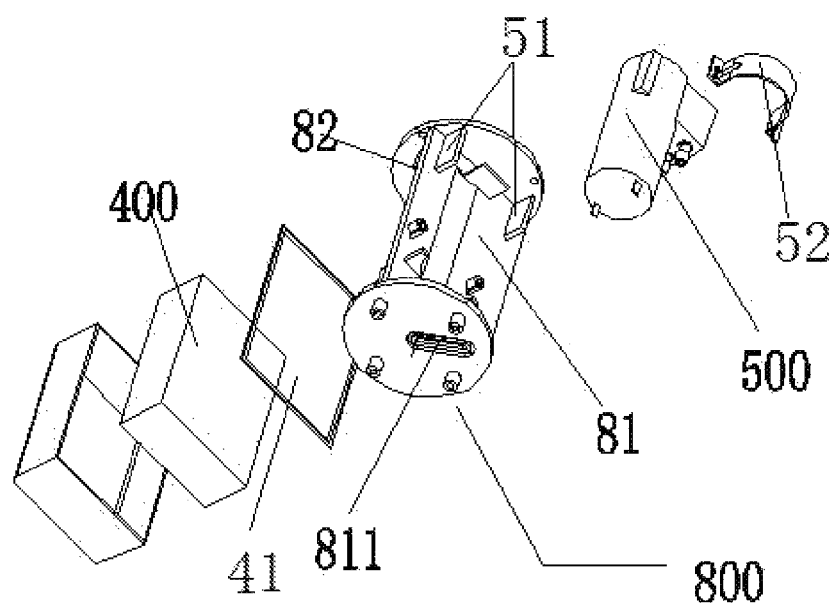
FIG. 5 is an exploded view of the assembly of the supporting structure with the battery and the pump.
Figure 6:
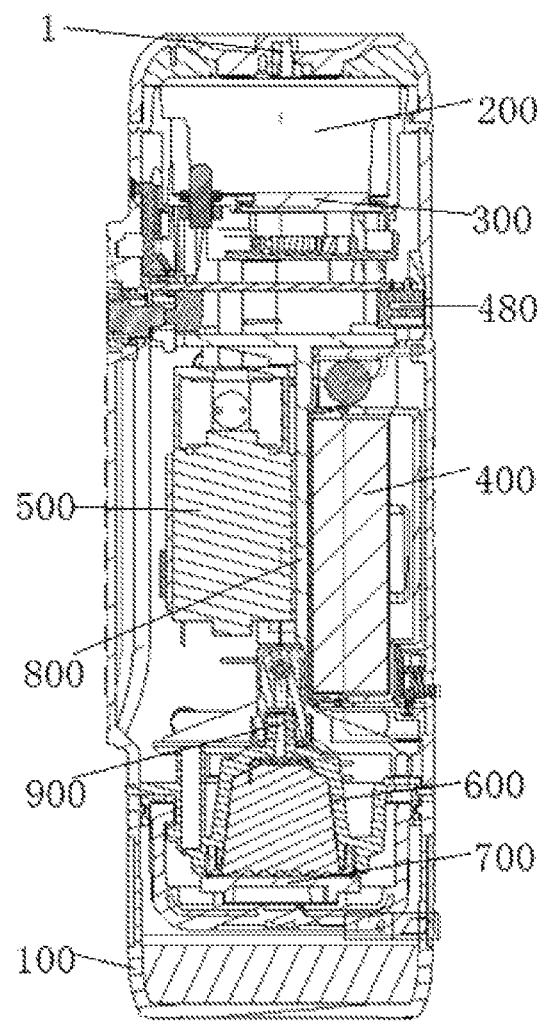
FIG. 6 is a section view of the portable household beverage machine according to the embodiment from another perspective.

In particular, the through hole 73 is arranged on the protrusion 72, and the protrusion 72 has a hollow structure; or, the protrusions 72 and the through holes 73 are arranged alternately on the piercing seat 71. In the present embodiment, arranging the protrusions 72 and the through holes 73 alternately on the piercing seat 71, and arranging the protrusions 72 and the through holes 73 in a grid, as shown in FIG. 2, such arrangement makes the whole piercing structure 700 under a balance force, which can prevent problems, such as poor piercing effect and poor flow diversion effect bought by imbalance force, from occurring.

In the present embodiment, the protrusion 72 has a trapezoidal structure. Such arrangement makes the protrusion 72 apply great pressure to the bottom of the beverage capsule under same pressure, facilitating piercing the bottom of the beverage capsule.

In addition, the piercing structure 700 further comprises a piercing seat body 74, the piercing seat 71 being embedded in the piercing seat body 74, a bottom of the piercing seat body 74 being provided with a beverage liquid outlet. In particular, the piercing seat body 74 may be in a threaded connection or a snap-fit connection with a lock catch with the bottom of the capsule bin 600, so that the protrusion 72 on the piercing structure 700 closely contacts with the bottom of the beverage capsule, which is convenient for the protrusions 72 to pierce the bottom of the beverage capsule. In the present embodiment, the piercing seat body 74 is in the threaded connection with the bottom of the capsule bin 600. Such arrangement can also prevent the piercing structure 700 from being pushed out while pressure in the beverage capsule is too high, making the piercing structure 700 unable to completely pierce the bottom of the beverage capsule, resulting in that the beverage liquid is unable to flow out smoothly.

In addition, a piercing tool 61 for piercing a top of a beverage capsule is provided in the capsule bin 600. When using the beverage capsule to prepare a beverage, such arrangement can eliminate the need for open a hole in advance at the top of the beverage capsule, providing convenience to the user.

In particular, the piercing tool 61 comprises a piercing tool pedestal 611 and blades 612 arranged on the piercing tool pedestal 611. The piercing tool pedestal 611 has a circular ring structure, the piercing tool pedestal 611 being embedded in a top of the capsule bin 600. The top of the capsule bin 600 is provided with an aperture communicated with the outlet of the pump 500, an inner ring of the circular ring structure being directly opposite to the aperture of the top of the capsule bin 600. Such arrangement can simplify a structure of the capsule bin 600.

In the present embodiment, the blades 612 are arranged around the piercing tool pedestal 611. This can reduce size of the piercing tool pedestal 611 while ensuring strength of the piercing tool pedestal 61, thereby reducing size of the capsule bin 600. A cutting edge of the blade 612 has an inclined structure. Such arrangement makes a contact area of the cutting edge and the top of the beverage capsule increase gradually, the pressure applied to the top of the beverage capsule is relatively high when a tip of the cutting edge just contacts the top of the beverage capsule, which is convenient for the blade to pierce the top of the beverage capsule.

In addition, bottom edges of the capsule bin 600 extend outwardly. Such arrangement makes it function as support for the piercing structure 700 when the piercing structure 700 located below the capsule bin 600 contacts with the beverage capsule, which is convenient for the piercing structure 700 to pierce the bottom of the beverage capsule.

In particular, a supporting structure 800 is provided in the second cavity, the supporting structure 800 comprising a first receiving cavity 81 and a second receiving cavity 82 which are vertical, the pump 500 and the battery 400 being fixedly mounted in the first receiving cavity 81 and the second receiving cavity 82 respectively. A bottom of the first receiving cavity 81 is provided with an opening 811, the outlet of the pump 500 being communicated with the capsule bin 600 by the opening 811. After the pump 500 and the battery 400 are mounted into the supporting structure 800, their entirety has an approximately cylindrical structure. Such arrangement makes installation spaces of the pump 500, the battery 400 and the capsule bin 600 be arranged reasonably, thereby making the household beverage machine have a small overall volume and be convenient for the user to carry.

In addition, the pump 500 has an L-shaped structure, the inlet and the outlet of the pump 500 being arranged in parallel in a horizontal direction of the L-shaped structure. Such arrangement can reduce a transverse space occupied by the pump 500, further reduces size of the supporting structure 800, and thereby reduces the size of the household beverage machine.

In particular, the battery 400 is detachably arranged in the second receiving cavity 82. When the user carries the household beverage machine while going out, the user may prepare a few more batteries 400, to meet the requirement of making beverage at any time. In the present embodiment, a waterproof element 41 is provided between the battery 400 and the second receiving cavity 82. Arrangement of the waterproof element 41 can protect the battery 400 better, and can prevent water from entering the battery 400.

In addition, the opening 811 has an oval structure, the opening 811 having two ports, with one port being communicated with the outlet of the pump 500, the other port being located at a center of a bottom of the supporting structure 800. Such arrangement is convenient for guiding water from a side wall of the supporting structure 800 to a center of the supporting structure 800, in order to prevent the beverage machine from being toppled which is caused by an impact force at the side wall of the supporting structure 800 when brewing beverage later.

In particular, two opposed fixing plates 51 for fixing the pump 500 are provided in the first receiving cavity 81.

Arranging the pump 500 between two fixing plates 51 prevents a motor of the pump 500 from driving the pump 500 shaking during working, thereby leading to loosening of the structure connected to the inlet and the outlet of the pump, resulting in leakage at the inlet and the outlet of the pump 500.

In addition, the supporting structure 800 further comprises a fixing element 52 for fixing the pump 500, the fixing element 52 being connected to the first receiving cavity 81. After the fixing element 52 is sleeved outside the pump 500, connecting both side of the fixing element 52 with the first receiving cavity 81 by a screw can further fix the pump 500, preventing the pump 500 from shaking.

In particular, a top of the tank 200 is provided with a detachable cover. An exhaust port 1 and a cover body 2 are provided on the cover. The cover body 2 has a hollowed-out structure and is arranged covering on the exhaust port 1. Arrangement of the exhaust port 1 is convenient for exhausting steam in the household beverage machine, and arrangement of the cover body 2 can prevent hot water from being ejected directly to hurt the user when the household beverage machine is tilted.

In addition, the portable household beverage machine further comprises a check valve 900, the outlet of the pump 500 being communicated with the capsule bin 600 by the check valve 900. Arrangement of the check valve 900 can prevent reverse flow of the brewed beverage liquid.

In particular, a silica gel is provided on an outer wall of the cup 100. The silica gel can increase friction between the cup 100 and the desktop or the user's hand, playing an anti-skidding role.

In addition, an AC adapter socket 480 connected to the battery 400 is provided on the body structure. Connecting both ends of a USB with the AC adapter socket 480 and the car's power supply, the household beverage machine can be driven to prepare a beverage or charge the battery.

In particular, the tank 200 has a maximum capacity of 50 ml.

In addition, the pump 500 has a work pressure of at least 7 bars. In the present embodiment, water in the pump 500 has a pressure of 15 bars when entering into the beverage capsule. The high pressure water can ensure that the prepared beverage is fragrant as well.

When using this household beverage machine to brew beverage, rotating and detaching the piercing seat body 74 from the bottom of the capsule bin 600, threadedly connecting the piercing seat body 74 with the bottom of the capsule bin 600 after putting the beverage capsule into the capsule bin 600, then the piercing tool 61 pierces a top of the beverage capsule. The battery 400 supplies electricity to the heating device 300 to heat water in the tank 200. After being heated, hot water in the tank 200 flows into the inlet of the pump 500, flows out from the outlet of the pump 500, and becomes high pressure water. The high pressure water can flow into the beverage capsule from a position where the top of the beverage capsule is pierced by the piercing tool 61. When the pressure in the beverage capsule reaches a certain value, the protrusion 72 on the piercing structure 700 pierces the bottom of the beverage capsule, so that the brewed fragrant beverage liquid in the beverage capsule flows out from the through hole 73 on the piercing structure 700 through the beverage liquid outlet into the cup 100. The present invention provides the portable household beverage machine, which not only is simple in structure, small in size, convenient for a user to carry, and satisfy the user's demand of drinking beverage anytime and anywhere, but can produce high pressure water automatically when brewing beverage, and brew the beverage that is fragrant as well.

Embodiment 2

Differences between Embodiment 2 and Embodiment 1 lie in that: in Embodiment 2, no piercing tool 61 for piercing the top of the beverage capsule is provided in the capsule bin 600, the capsule bin pedestal is not a piercing structure 700, and the function of the capsule bin pedestal is to be connected to the capsule bin 600 to place beverage powder in the capsule bin 600. When using this portable household beverage machine to brew beverage, separating the capsule bin pedestal from the capsule bin 600, connecting the capsule bin pedestal the capsule bin 600 after placing the beverage powder in the capsule bin 600, then high pressure water flowing out from the pump 500 can flow into the capsule bin 600 from a top of the capsule bin 600 and brew the beverage powder in the capsule bin 600, and brewed fragrant beverage liquid in the capsule bin 600 flows through the capsule bin pedestal into the cup 100, and then a user may drink it after taking the cup 100.

Embodiment 3

Differences between Embodiment 3 and Embodiment 2 lie in that: the capsule bin pedestal is a piercing structure 700, the piercing structure 700 being used for piercing a bottom of a beverage capsule placed in the capsule bin 600 and communicating the beverage capsule with the cup 100. When using this portable household beverage machine to brew beverage, pre-providing an aperture at a top of the beverage capsule, separating the piercing structure 700 from the capsule bin 600, connecting the piercing structure 700 with the capsule bin 600 after the beverage capsule is placed in the capsule bin 600, then high pressure water flowing out from the pump 500 can flow into the beverage capsule from the aperture arranged at the top of the beverage capsule. When the pressure in the beverage capsule reaches a certain value, the piercing structure 700 pierces a bottom of the beverage capsule, so that brewed fragrant beverage liquid in the beverage capsule flows through the piercing structure 700 into the cup 100.

Embodiment 4

Differences between Embodiment 4 and Embodiment 2 lie in that: a piercing tool 61 for piercing a top of a beverage capsule is provided in the capsule bin 600. When the beverage capsule is placed in the capsule bin 600, the piercing tool 61 can pierce the top of the beverage capsule, omitting a step of pre-providing an aperture at the top of the beverage capsule, providing convenience for the user.

Apparently, the above-described embodiments of the present invention are just examples for describing the present invention clearly, but not limitation to the implementations of the present invention. For those having ordinary skill in the art, variations or changes in different forms can be made on the basis of the above description. All of the implementations should not and could not be exhaustive herein. Any amendment, equivalent replacement and improvement made within the spirit and principle of the present invention shall all be included within the scope of protection of the claims of the present invention.

What is claimed:

1. A portable household beverage machine for adding a substance to be brewed into water to make a beverage, comprising:
   a body structure;
   a cup detachably connected to the body structure;
   a first containing cavity for containing water;
   a pressurizing device;
   a second containing cavity for containing the substance to be brewed; and
   a containing cavity pedestal for closing the second containing cavity,
   wherein the first containing cavity, the pressurizing device and the second containing cavity are provided in the body structure and are communicated in sequence,
   the containing cavity pedestal is detachably connected to the body structure or the second containing cavity, and communicates with the cup,
   a space is configured to be formed in the cup when the cup is connected to the body structure for containing all the beverage being output.

2. The portable household beverage machine according to claim 1, wherein the first containing cavity for containing water is a tank, the second containing cavity for containing the substance to be brewed is a capsule bin, the containing cavity pedestal is a capsule bin pedestal, and the pressurizing device is a pump; wherein the beverage is obtained after boiling, infiltrating or brewing the substance to be brewed with water in the capsule bin.

3. The portable household beverage machine according to claim 1, further comprising a pedestal of the cup, wherein the pedestal of the cup is a level structure, wherein a silica gel is provided on an outer wall of the cup.

4. The portable household beverage machine according to claim 2, wherein the body structure comprises a first cavity and a second cavity which are connected in sequence, wherein the tank is provided in the first cavity, the pump, the capsule bin and the capsule bin pedestal are provided in the second cavity, the cup is detachably connected to the second cavity.

5. The portable household beverage machine according to claim 4, further comprising:
   a heating device for heating the tank, wherein the heating device is provided in the first cavity; and
   a battery for supplying electricity to the pump and the heating device, wherein the battery is provided in the second cavity.

6. The portable household beverage machine according to claim 2, wherein the capsule bin pedestal is a piercing structure, the piercing structure is configured to pierce a bottom of a beverage capsule placed in the capsule bin and communicating the beverage capsule with the cup.

7. The portable household beverage machine according to claim 6, wherein the piercing structure comprises a piercing seat, protrusions and through holes; the protrusion is arranged on an upper surface of the piercing seat and used for piercing the bottom of the beverage capsule located in the capsule bin; and the through holes penetrate the piercing seat and are used for communicating the beverage capsule and the cup.

8. The portable household beverage machine according to claim 7, wherein the through holes are arranged on the protrusions, and the protrusions have a hollow structure; or the protrusions and the through holes are arranged alternately on the piercing seat.

9. The portable household beverage machine according to claim 8, wherein the protrusions and the through holes are arranged in a grid.

10. The portable household beverage machine according to claim 7, wherein the piercing structure further comprises a piercing seat body, the piercing seat is embedded in the piercing seat body, a bottom of the piercing seat body is provided with a beverage liquid outlet; wherein the piercing seat body connects to a bottom of the capsule bin through a threaded or a snap-fit attachment with a lock.

11. The portable household beverage machine according to claim 2, wherein a piercing tool for piercing a top of a beverage capsule is provided in the capsule bin.

12. The portable household beverage machine according to claim 11, wherein the piercing tool comprises a piercing tool pedestal and blades arranged on the piercing tool pedestal; wherein the piercing tool pedestal has a circular ring structure, and is embedded at a top of the capsule bin; and the top of the capsule bin is provided with an aperture being communicated with an outlet of the pump, an inner ring of the circular ring structure is directly opposite to the aperture of the top of the capsule bin.

13. The portable household beverage machine according to claim 12, wherein the blades are arranged around the piercing tool pedestal.

14. The portable household beverage machine according to claim 12, wherein a cutting edge of the blade has an inclined structure.

15. The portable household beverage machine according to claim 2, wherein bottom edges of the capsule bin extend outwardly.

16. The portable household beverage machine according to claim 5, wherein a supporting structure is provided in the second cavity, the supporting structure comprises a first receiving cavity and a second receiving cavity which are vertical, the pump and the battery are fixedly mounted in the first receiving cavity and the second receiving cavity, respectively; an opening is provided at a bottom of the first receiving cavity, an outlet of the pump is communicated with the capsule bin through the opening; after the pump and the battery are mounted into the supporting structure, their entirety has an approximately cylindrical structure.

17. The portable household beverage machine according to claim 16, wherein the pump has an L-shaped structure, an inlet and the outlet of the pump are arranged in parallel in a horizontal direction; wherein two opposed fixing plates for fixing the pump are provided in the first receiving cavity.

18. The portable household beverage machine according to claim 16, wherein the battery is detachably arranged in the second receiving cavity; wherein a waterproof element is provided between the battery and the second receiving cavity.

19. The portable household beverage machine according to claim 16, wherein the opening has an oval structure and two ports, one port is communicated with the outlet of the pump, the other port is located at a center of a bottom of the supporting structure.

20. The portable household beverage machine according to claim 16, wherein the supporting structure further comprises a fixing element for fixing the pump, the fixing element is connected to the first receiving cavity.

21. The portable household beverage machine according to claim 2, wherein a top of the tank is provided with a detachable cover, an exhaust port and a cover body being provided on the cover, the cover body has a hollowed-out structure and is arranged to cover the exhaust port; wherein a silicone pad is provided at a location where the cover fits over the tank.

22. The portable household beverage machine according to claim 2, further comprising a check valve, wherein an outlet of the pump is being communicated with the capsule bin by the check valve.

23. The portable household beverage machine according to claim 2, wherein the tank has a maximum capacity of 50 ml.

24. The portable household beverage machine according to claim 6, wherein the pump has a work pressure of at least 7 bars.

25. The portable household beverage machine according to claim 24, wherein water in the pump has a pressure of 15 bars when entering into the beverage capsule.

\* \* \* \* \*